(12) United States Patent
Yang et al.

(10) Patent No.: US 9,432,986 B2
(45) Date of Patent: Aug. 30, 2016

(54) CONTROL SIGNAL TRANSCEIVING METHOD AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 2 days.

(21) Appl. No.: 14/398,922

(22) PCT Filed: May 8, 2013

(86) PCT No.: PCT/KR2013/004030
§ 371 (c)(1),
(2) Date: Nov. 4, 2014

(87) PCT Pub. No.: WO2013/169003
PCT Pub. Date: Nov. 14, 2013

(65) Prior Publication Data
US 2015/0124724 A1   May 7, 2015

Related U.S. Application Data

(60) Provisional application No. 61/644,398, filed on May 8, 2012.

(51) Int. Cl.
*H04W 72/04* (2009.01)
*H04L 5/00* (2006.01)
*H04L 5/14* (2006.01)

(52) U.S. Cl.
CPC .......... *H04W 72/042* (2013.01); *H04L 5/0028* (2013.01); *H04L 5/0053* (2013.01); *H04L 5/0092* (2013.01); *H04L 5/001* (2013.01); *H04L 5/0023* (2013.01); *H04L 5/1469* (2013.01)

(58) Field of Classification Search
None
See application file for complete search history.

(56) References Cited

U.S. PATENT DOCUMENTS

| 8,717,938 | B2* | 5/2014 | Wang | H04L 5/0048 370/254 |
| 8,897,202 | B2* | 11/2014 | Chen | H04B 7/155 370/310 |
| 2010/0227569 | A1 | 9/2010 | Bala et al. | |
| 2011/0038331 | A1* | 2/2011 | Chmiel | H04W 28/06 370/329 |
| 2011/0086659 | A1* | 4/2011 | Yoon | H04L 5/0007 455/509 |
| 2013/0176952 | A1* | 7/2013 | Shin | H04L 5/001 370/329 |

FOREIGN PATENT DOCUMENTS

| KR | 10-2011-0040672 A | 4/2011 |
| KR | 10-2011-0065329 A | 6/2011 |
| KR | 10-2011-0122033 A | 11/2011 |
| KR | 10-2012-0016565 A | 2/2012 |

* cited by examiner

*Primary Examiner* — Hong Cho
(74) *Attorney, Agent, or Firm* — Dentons US LLP

(57) ABSTRACT

The present invention relates to a wireless communication system. More particularly, the present invention relates to a method and an apparatus for receiving control information in a wireless communication system in which a first carrier type and a second carrier type are aggregated. The method comprises a step of receiving grant information for signal transmission on the second carrier type, wherein the grant information is received through the second carrier type if the grant information includes a first downlink control information (DCI) format, wherein the grant information is received through the first carrier type if the grant information includes a second DCI format.

14 Claims, 12 Drawing Sheets

* When the grant information includes a first type DCI format, the grant information is received through the NCT carrier itself
* When the grant information includes a second type DCI format, the grant information is received through a specific LCT carrier

CONTROL SIGNAL TRANSCEIVING METHOD AND APPARATUS FOR SAME

This application is a 35 USC §371 National Stage entry of International Application No. PCT/KR2013/004030 filed on May 8, 2013, and claims priority to U.S. Provisional Application No. 61/644,398 filed on May 8, 2012, both of which are hereby incorporated by reference in their entireties as if fully set forth herein.

TECHNICAL FIELD

The present invention relates to a wireless communication system, and more particularly, to a method and apparatus for effectively transmitting and receiving a control signal in a wireless communication system in which a plurality of carriers is aggregated.

BACKGROUND ART

Wireless communication systems are widely developed to provide a various kinds of communication services such as audio or data service. In general, a wireless communication system is a multiple access system capable of supporting communications with multiple users by sharing available system resources (bandwidths, transmission power, etc.). Examples of the multiple access system include code division multiple access (CDMA) system, frequency division multiple access (FDMA) system, time division multiple access (TDMA) system, orthogonal frequency division multiple access (OFDMA) system, single carrier frequency division multiple access (SC-FDMA) system, multi-carrier frequency division multiple access (MC-FDMA) system, etc. In a wireless communication system, a user equipment (UE) can receive information from a base station (BS) in downlink (DL) and transmit information to the BS in uplink (UL). The information transmitted or received by the UE includes data and various control information and various physical channels are present according to the type and usage of the information transmitted or received by the UE.

DISCLOSURE

Technical Problem

An object of the present invention devised to solve the problem lies in an apparatus and method for effectively transmitting and receiving a signal in a wireless communication system in which a plurality of carriers is aggregated.

Another object of the present invention provides an apparatus and method for effectively transmitting and receiving a signal in consideration of a carrier type.

Another object of the present invention provides an apparatus and method for effectively transmitting and receiving scheduling information in a wireless communication system in which a plurality of carriers with different carrier types is aggregated.

It is to be understood that both the foregoing general description and the following detailed description of the present invention are exemplary and explanatory and are intended to provide further explanation of the invention as claimed.

Technical Solution

The object of the present invention can be achieved by providing a method for receiving control information by a user equipment (UE) in a wireless communication system in which a first type of carrier and a second type of carrier are aggregated, the method including receiving grant information for signal transmission on the second type of carrier, wherein the grant information is received through the second type of carrier when the grant information includes first type of downlink control information (DCI) format, and the grant information is received through the first type of carrier when the grant information includes a second type of DCI format.

Preferably, the first type of DCI format may include downlink dedicated DCI format, and the second type of DCI format may include uplink dedicated DCI format, uplink common DCI format, or downlink common DCI format.

Preferably, the first type of DCI format may include downlink dedicated DCI format or downlink common DCI format, and the second type of DCI format may include uplink dedicated DCI format or uplink common DCI format.

Preferably, the sum of a total blind decoding number of times for the downlink common DCI format and a total blind decoding number of times for uplink common DCI format may be configured to be equal to or smaller than a maximum number of times for blind decoding for uplink/downlink common DCI format when the downlink common DCI format and the uplink common DCI format are transmitted through the same carrier.

Preferably, the grant information including the second type of DCI format may be received through the first type of carrier when cross carrier scheduling is not configured for the UE and a cell-specific reference signal (CRS) is not transmitted on the second type of carrier at subframe timing for receiving the grant information.

Preferably, the grant information including the second type of DCI format may be received through the first type of carrier when cross carrier scheduling is not configured for the UE and a demodulation reference signal (DMRS) is not transmitted on the second type of carrier at subframe timing for receiving the grant information.

Preferably, the grant information including the second type of DCI format may be received through the first type of carrier when cross carrier scheduling is not configured for the UE and subframe timing for receiving the grant information is a subframe including an uplink period, a protection period, and a downlink period.

Preferably, the downlink period may include m or less symbols, where m may be one of 3, 6, and 7.

In another aspect of the present invention, provided herein is a user equipment (UE) for receiving control information in a wireless communication system in which a first type of carrier and a second type of carrier are aggregated, the UE including a radio frequency (RF) unit, and a processor, wherein the processor is configured to receive grant information for signal transmission on the second type of carrier through the RF unit, the grant information is received through the second type of carrier when the grant information includes a first type of downlink control information (DCI) format, and the grant information is received through the first type of carrier when the grant information includes a second type of DCI format.

Preferably, the first type of DCI format may include downlink dedicated DCI format, and the second type of DCI format may include uplink dedicated DCI format, uplink common DCI format, or downlink common DCI format.

Preferably, the first type of DCI format may include downlink dedicated DCI format or downlink common DCI format, and the second type of DCI format may include uplink dedicated DCI format or uplink common DCI format.

Preferably, the sum of a total blind decoding number of times for the downlink common DCI format and a total blind decoding number of times for uplink common DCI format may be configured to be equal to or smaller than a maximum number of times for blind decoding for uplink/downlink common DCI format when the downlink common DCI format and the uplink common DCI format are transmitted through the same carrier.

Preferably, the grant information including the second type of DCI format may be received through the first type of carrier when cross carrier scheduling is not configured for the UE and a cell-specific reference signal (CRS) is not transmitted on the second type of carrier at subframe timing for receiving the grant information.

Preferably, the grant information including the second type of DCI format may be received through the first type of carrier when cross carrier scheduling is not configured for the UE and a demodulation reference signal (DMRS) is not transmitted on the second type of carrier at subframe timing for receiving the grant information.

Preferably, the grant information including the second type of DCI format may be received through the first type of carrier when cross carrier scheduling is not configured for the UE and subframe timing for receiving the grant information is a subframe including an uplink period, a protection period, and a downlink period.

Preferably, the downlink period may include m or less symbols, where m is one of 3, 6, and 7.

Advantageous Effects

According to embodiments of the present invention, signals can be effectively transmitted and received in a wireless communication system in which a plurality of carriers is aggregated.

According to embodiments of the present invention, signals can be effectively transmitted and received according to a carrier type.

According to embodiments of the present invention, scheduling information can be effectively transmitted and received in a wireless communication system in which a plurality of carriers with different carrier types is aggregated.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE. Throughout this specification, the LTE system may be referred to as a system according to $3^{rd}$ generation partnership project (3GPP) technical specification (TS) 36 8 (Release 8). In addition, in this specification, the LTE-A system may be referred to as a system according to 3GPP TS 36 series release 9 and 10 (Release 9 and 10). The LTE(-A) system may be called to include the LTE system and the LTE-A system. For clarity, the following description focuses on 3GPP LTE(-A) system. However, technical features of the present invention are not limited thereto.

In a mobile communication system, a UE may receive information from a BS in downlink and transmit information in uplink. The information transmitted or received by the UE may be data and various control information. In addition, there are various physical channels according to the type or use of the information transmitted or received by the UE.

Figure 1:
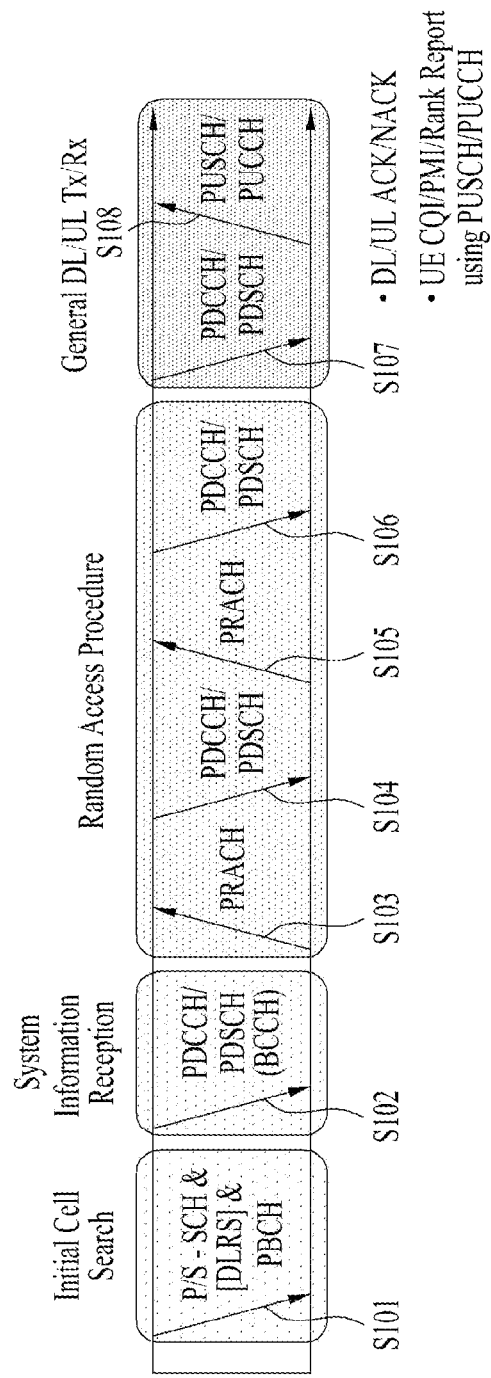
FIG. 1 illustrates physical channels and a general method for transmitting signals on the physical channels in the LTE(-A) system.

FIG. 1 illustrates physical channels and a general method for transmitting signals on the physical channels in the LTE(-A) system.

When a UE is powered on or enters a new cell, the UE performs initial cell search in step S101. The initial cell search involves acquisition of synchronization to an eNB. To this end, the UE synchronizes its timing to the eNB and acquires information such as a cell identifier (ID) by receiving a primary synchronization channel (P-SCH) and a secondary synchronization channel (S-SCH) from the eNB. Then the UE may acquire broadcast information in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S102.

To complete access to the eNB, the UE may perform a random access procedure such as steps S103 to S106 with the eNB. To this end, the UE may transmit a preamble on a physical random access channel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S106).

After the above procedure, the UE may receive a PDCCH and/or a PDSCH from the eNB (S107) and transmit a physical uplink shared channel (PUSCH) and/or a physical uplink control channel (PUCCH) to the eNB (S108), in a general UL/DL signal transmission procedure. Information that the UE transmits to the eNB is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 2:
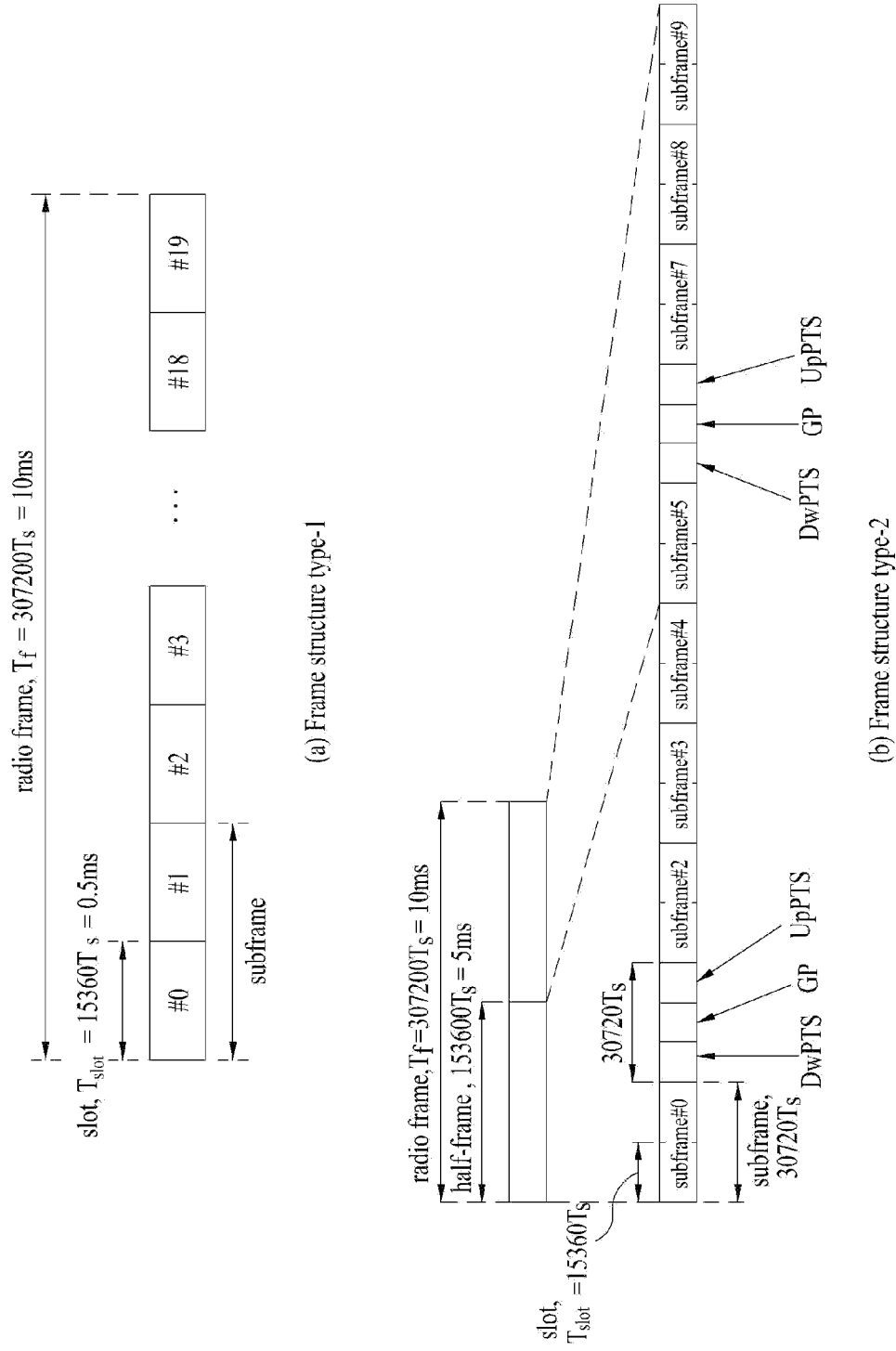
FIGS. 2(a) and 2(b) illustrate a structure of a radio frame used in an LTE(-A) system.

FIG. 2 illustrates a structure of a radio frame used in an LTE(-A) system. In a cellular OFDM radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 2(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of first two or three OFDM symbols of each subframe may be assigned to a physical downlink control channel (PDCCH) and the remaining OFDM symbols may be assigned to a physical downlink shared channel (PDSCH).

FIG. 2(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in an eNB and to transmit a physical random access channel (PRACH) that carriers a random access preamble for uplink transmission synchronization. The GP is used to eliminate interference generated in uplink due to multi-path delay of a downlink signal between uplink and downlink. Table 1 below shows an uplink (UL)-downlink (DL) configuration in subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a DL subframe, U represents a UL subframe, and S represents a special subframe. The special subframe includes a downlink pilot timeslot (DwPTS), a guard period (GP), and an uplink pilot timeslot (UpPTS). Table 2 below shows a special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is purely exemplary and thus the number of subframes in a radio frame, the number of slots in a subframe, or the number of symbols in a slot may vary in different ways.

Figure 3:
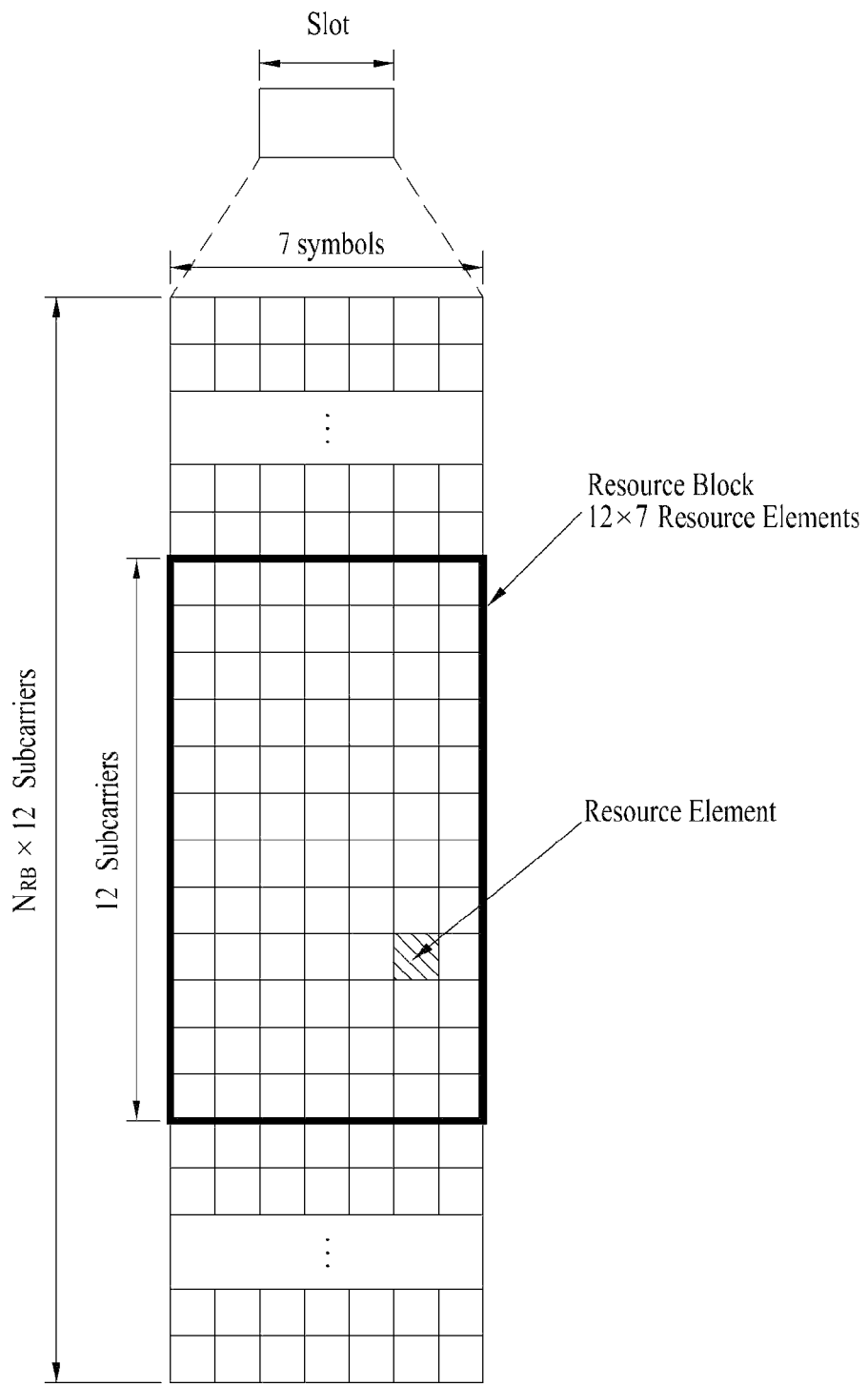
FIG. 3 illustrates a resource grid of one downlink (DL) slot used in an LTE(-A) system.

FIG. 3 illustrates a resource grid of one DL slot used in an LTE(-A) system.

Referring to FIG. 3, a DL slot includes a plurality of OFDM symbols in the time domain. One DL slot may include 7 OFDM symbols and a resource block (RB) may include 12 subcarriers in the frequency domain. However, the present invention is not limited thereto. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 4:
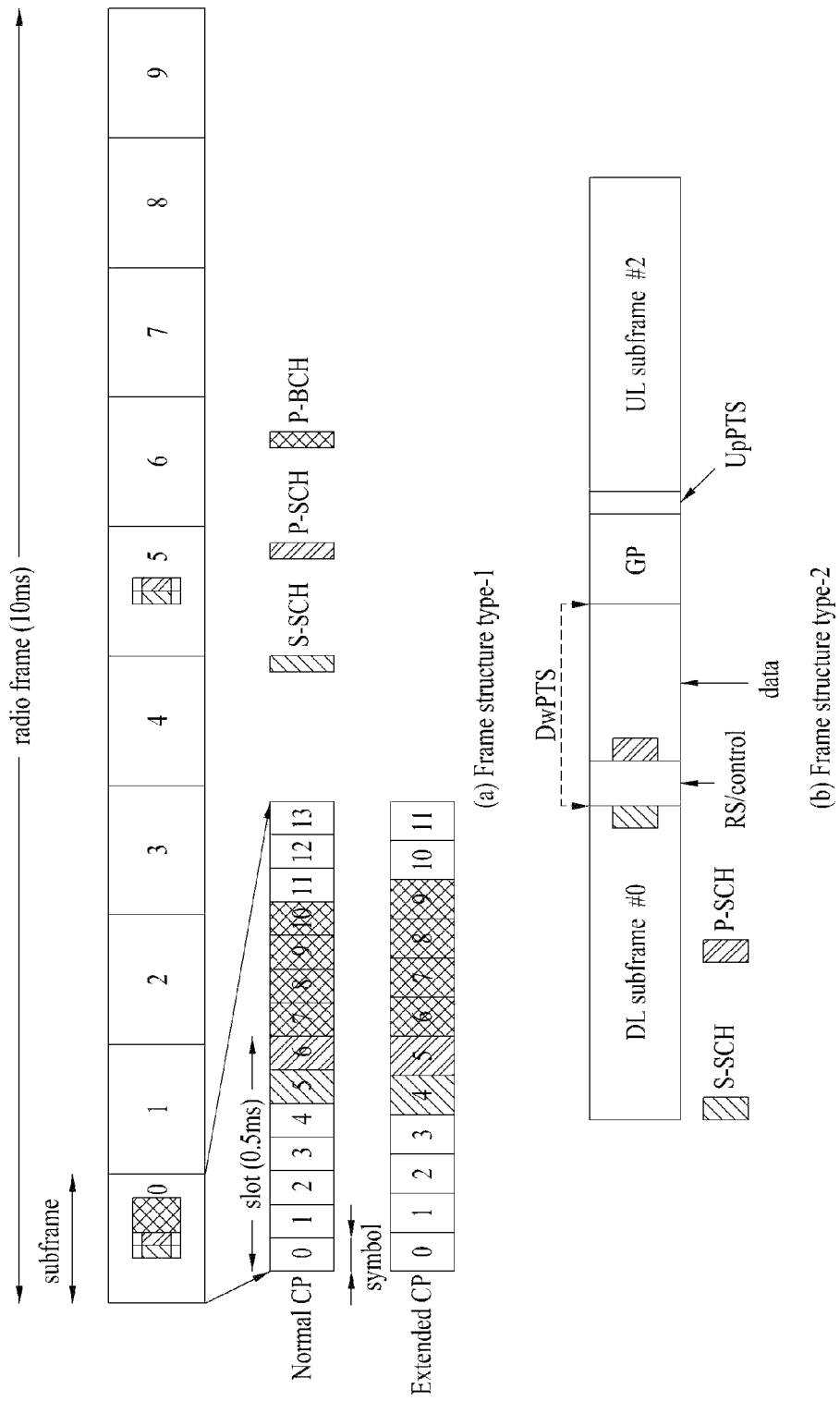
FIGS. 4(a) and 4(b) illustrate a primary broadcast channel (P-BCH) and a synchronization channel (SCH)

FIG. 4 illustrates a primary broadcast channel (P-BCH) and a synchronization channel (SCH). The SCH includes a primary SCH (P-SCH) and a secondary SCH (S-SCH). A primary synchronization signal (PSS) is transmitted on the P-SCH and a secondary synchronization signal (SSS) is transmitted on the S-SCH.

Referring to FIG. 4, in the type-1 radio frame structure (i.e., FDD), a P-SCH is positioned in the last OFDM symbol of slot #0 (i.e., a first slot of subframe #0) and slot #10 (i.e., a first slot of subframe #5) every radio frame. An S-SCH is positioned an OFDM symbol just upstream of the last OFDM symbol of slot #0 and slot #10 every radio frame. The S-SCH and the P-SCH are positioned in adjacent OFDM symbols. In the type-2 radio frame structure (i.e., TDD), a P-SCH is transmitted through a third OFDM symbol of subframe #1/#6 and an S-SCH is positioned in the last OFDM symbol of slot #1 (i.e., a second slot of subframe #0) and slot #11 (i.e., a second slot of subframe #5). The P-BCH is transmitted every four radio frames irrespective of a frame structure type and transmitted using first to fourth OFDM symbols of a second slot of subframe #0. The P-SCH is transmitted using 72 subcarriers (10 subcarriers are reserved and 62 subcarriers are used for PSS transmission) in terms of a direct current (DC) subcarrier in an OFDM symbol. The S-SCH is transmitted using 72 subcarriers (10 subcarriers are reserved and 62 subcarriers are used for SSS transmission) in terms of a DC subcarrier in an OFDM symbol. The P-BCH is mapped to 72 subcarriers in terms of a DC subcarrier and four OFDM symbols in one subframe.

Figure 5:
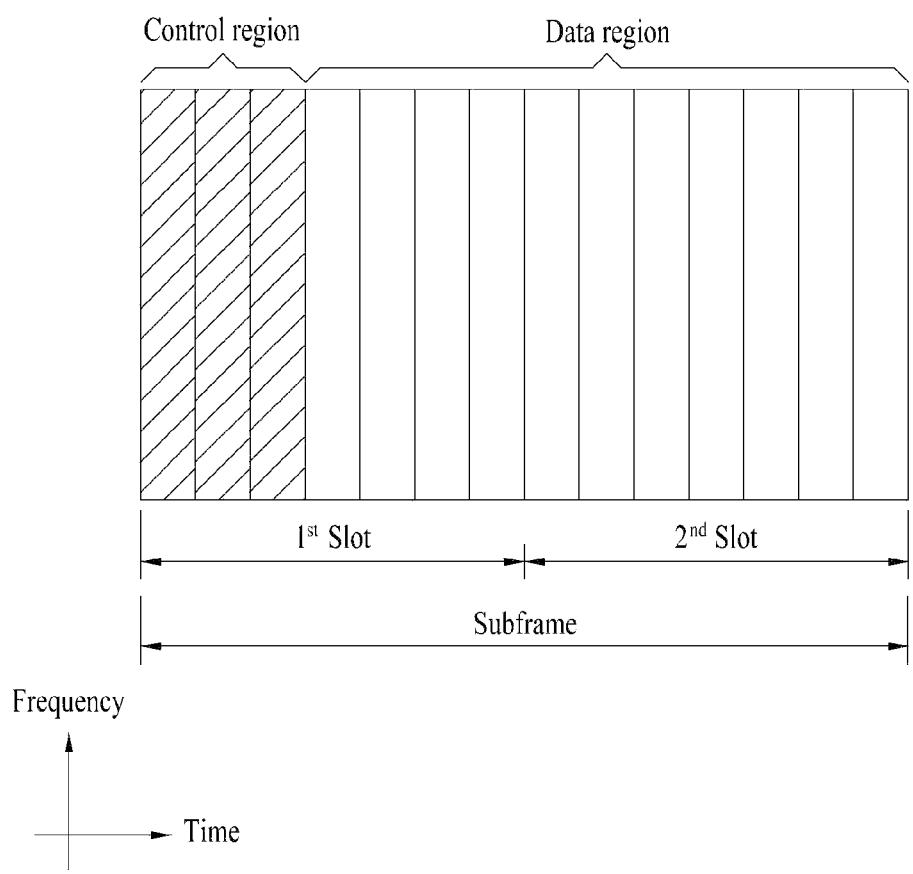
FIG. 5 illustrates a downlink subframe structure used in the LTE(-A) system.

FIG. 5 illustrates a downlink subframe structure used in the LTE(-A) system.

Referring to 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

Figure 6:
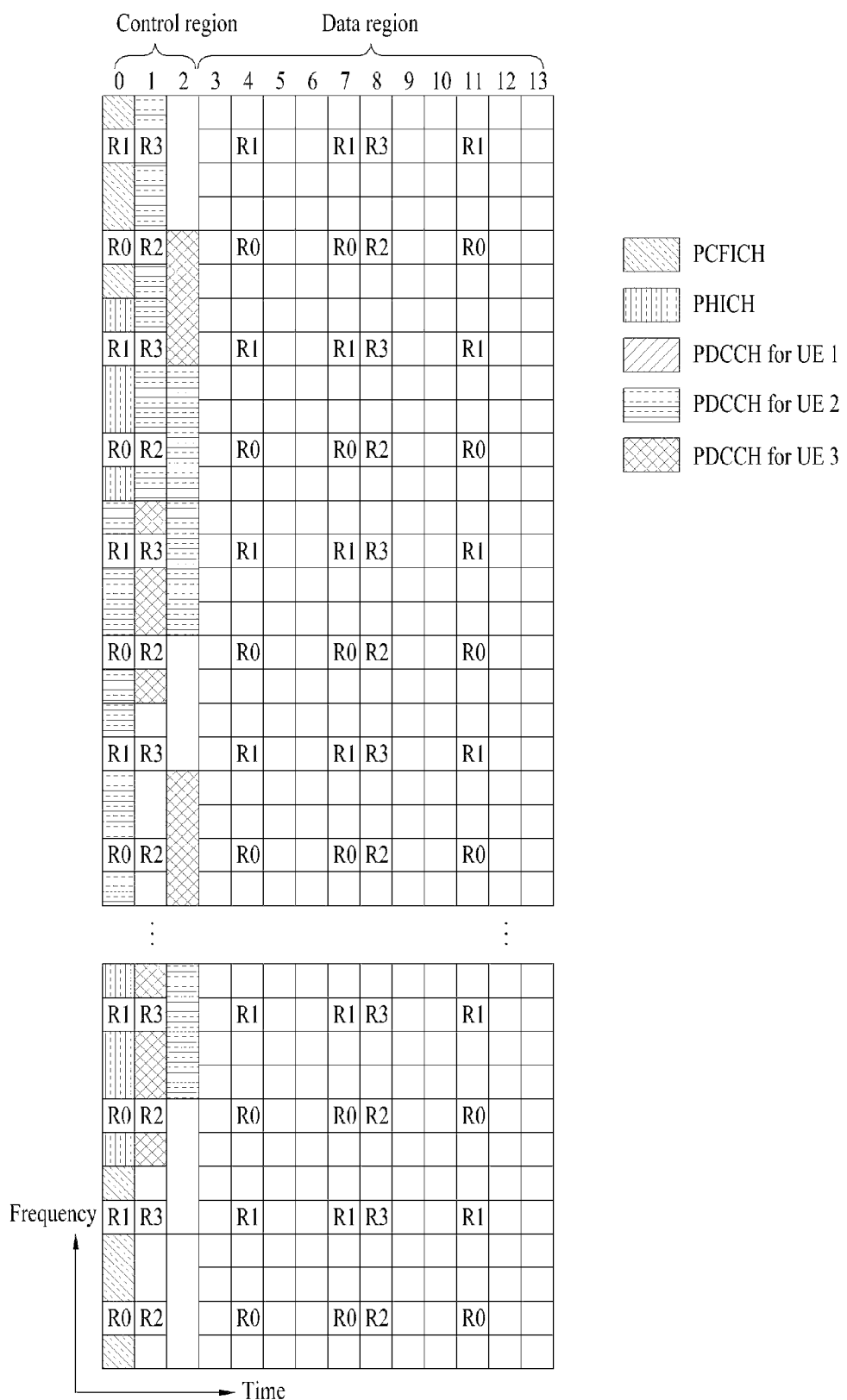
FIG. 6 illustrates a control channel allocated to a downlink subframe.

FIG. 6 illustrates a control channel allocated to a downlink subframe. In FIG. 6, R1 to R4 denote a cell-specific reference signal (CRS) or a cell-common reference signal for antenna ports 0 to 3. The CRS is transmitted in all bands every subframe and fixed in a predetermined pattern in a subframe. The CRS is used to channel measurement and downlink signal demodulation.

Referring to FIG. 6, the PCFICH is transmitted at a first OFDM symbol of a subframe and carries information regarding the number of OFDM symbols used for transmission of control channels within the subframe. The PCFICH is composed of four REGs that are uniformly distributed in a control region based on a cell ID. The PCFICH indicates a value of 1 to 3 (or 2 to 4) and is modulated via quadrature phase shift keying (QPSK). The PHICH is a response of uplink transmission and carries an HARQ acknowledgment (ACK)/not-acknowledgment (NACK) signal. The PHICH except for CRS and PCFICH (a first OFDM symbol) is allocated on the remaining REGs in one or more OFDM symbols configured by PHICH duration. The PHICH is allocated to three REGs that are distributed if possible on the frequency domain.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs may be transmitted in one subframe. Each PDCCH is transmitted using one or more control channel elements (CCEs) and each CCE corresponds to nine sets of four resource elements. The four resource elements are referred to as a resource element group (REG). Four QPSK symbols are mapped to one REG. A resource element allocated to a reference signal is not included in an REG and thus a total number of REGs in a given OFDM symbol varies according to whether a cell-specific reference signal is present.

Table 3 shows the number of CCEs, the number of REGs, and the number of PDCCH bits according to PDCCH format.

TABLE 3

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the SS has different sizes according to each PDCCH format. In addition, a UE-specific SS and a common SS are separately defined. The BS does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in an SS is referred to as blind decoding (blind detection). Through blind decoding, the UE simultaneously performs identification of the PDCCH transmitted to the UE and decoding of the control information transmitted through the corresponding PDCCH. For example, in the case where the PDCCH is demasked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in an SS for a specific UE, the remaining CCEs are not present. Thus a BS may not find CCE resources in which the PDCCH is to be transmitted to all available UEs in a given subframe. In order to minimize the possibility that such blocking is subsequent to a next subframe, a start position of the USS is UE-specifically hopped.

Table 4 shows sizes of CSS and USS.

TABLE 4

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the UE-specific search space. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the UE-common search space. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. A PDSCH transmission scheme and information contents of DCI formats according to a transmission mode will be listed below.

Transmission Mode (TM)
    Transmission Mode 1: Transmission from a single eNB antenna port
    Transmission Mode 2: Transmit diversity
    Transmission Mode 3: Open-loop spatial multiplexing
    Transmission Mode 4: Closed-loop spatial multiplexing
    Transmission Mode 5: Multi-user MIMO
    Transmission Mode 6: Closed-loop rank-1 precoding Transmission Mode 7: Single-antenna port (port 5) transmission
Transmission Mode 8: Dual layer transmission (ports 7 and 8) or single-antenna port (port 7 or 8) transmission
Transmission Modes 9 and 10: Layer transmission up to rank 8 (ports 7 to 14) or single-antenna port (port 7 or 8) transmission DCI Format Format 0: Resource grant for PUSCH transmission (uplink)
Format 1: Resource allocation for single codeword PUSCH transmission (transmission modes 1, 2, and 7)
Format 1A: Compact signaling of resource allocation for single codeword PDSCH transmission (all modes)
Format 1B: Compact resource allocation for PDSCH (mode 6) using rank-1 closed-loop precoding
Format 1C: Very compact resource allocation for PDSCH (e.g., paging/broadcast system information)
Format 1D: Compact resource allocation for PDSCH (mode 5) using multi-user MIMO
Format 2: Resource allocation for PDSCH (mode 4) of closed-loop MIMO operation
Format 2A: Resource allocation for PDSCH (mode 3) of open-loop MIMO operation
Format 3/3A: Power control command with 2-bit/1-bit power adjustments for PUCCH and PUSCH
Format 4: Resource grant for PUSCH transmission (uplink) in a cell configured in a multi-antenna port transmission mode A UE may be semi-statically configured via higher layer signaling for reception of PDSCH data transmission that is scheduled through the PDCCH according to ten transmission modes. Table 5 below shows a transmission mode signaled via a higher layer and configurable DCI format when a UE detects a scrambled PDCCH as a C-RNTI identifier.

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2D | UE specific by C-RNTI | Up to 8 layer transmission, ports 7-14 or single-antenna port, port 7 or 8 |

A UE detects a PDCCH according to each combination defined in Table 5 above and receives a PDSCH corresponding to the PDCCH. That is, the UE may detect DCI format in a corresponding search space according to a transmission mode signaled via a higher layer and receive data using different PDSCH transmission methods.

In the case of a transmission mode 8 (TM 8), detected DCI format may be classified into DCI format 1A and DCI format 2B. When DCI detected by a UE is format 1A, a search space is configured as a common search space (CSS) and a UE specific search space (USS) according to a cell radio-network temporary identifier (C-RNTI). In addition, a PDSCH transmission scheme is configured to use port #0 when the number of physical broadcast channel (PBCH) antenna ports is one, that is, when a single antenna port is used, and configured to use a transmit diversity scheme in the other cases. When DCI format detected by a UE is 2B, a search space is configured as a UE specific search space (USS) according to C-RNTI. In addition, a UE is configured to use a dual layer transmission method using antenna ports #7 and #8 or configured to use a single-antenna port transmission scheme using antenna port #7 or #8.

In the case of a UE configured to be in a transmission mode 9 (TM 9), detected DCI format may be classified into DCI format 1A and DCI format 2C. When DCI detected by a UE is format 1A, a search space is configured as a common search space (CSS) and a UE specific search space (USS) according to C-RNTI. When DCI detected by a UE configured to be in TM 9 has DCI format 1A, a PDSCH transmission scheme is differently configured according to whether a multimedia broadcast single frequency network (MBSFN) subframe is used. When the MBSFN subframe is not used, if the number of physical broadcast channel (PBCH) antenna ports is one, that is, when a single antenna port is used, the PDSCH transmission scheme is configured to use port #0, and configured to use a transmit diversity scheme. When the MBSFN subframe is used, the PDSCH transmission scheme is configured to use antenna port #7 as a single antenna port.

When DCI format detected by a UE configured to be in TM 9 is 2C, a search space is configured as a UE specific search space (USS) according to C-RNTI. In this case, the PDSCH transmission scheme is configured to use a maximum of 8 layers corresponding to antenna ports #7 to #14 or configured to use a single antenna port of antenna port #7 or #8.

In the case of a UE configured to be in transmission mode 10 (TM 10), detected DCI format may be classified into DCI format 1A and DCI format 2D. When DCI detected by the UE is format 1A, the same description as in the case of TM 9 can be applied. When DCI format 2D is detected, the same description as in the case of DCI format 2C of TM 9 can be applied.

TM 10 may be used in a coordinated multi-point (CoMP) system. Examples of a CoMP scheme that can be applied to downlink may include a joint transmission (JT) scheme, a coordinated scheduling/beamforming (CS/CB) scheme, and a dynamic cell selection (DCS) scheme.

Joint transmission is a technique of transmitting a DL signal (e.g., PDSCH, PDCCH, etc.) from a plurality of points (a part or the whole of points that participate in a CoMP operation) at one time. That is, a plurality of transmission points may simultaneously transmit data to a single UE. The joint transmission scheme can improve the quality of a received signal coherently or non-coherently and actively eliminate interference to other UEs, as well. Dynamic cell selection is a technique of transmitting a PDSCH from one point of points that participate in CoMP at one time. That is, one point transmits data to a single UE at a given time point, while the other points of the CoMP unit do not transmit data to the UE at the time point. A point to transmit data to a UE may be dynamically selected. Meanwhile, in the CS/CB scheme, points that participate in CoMP perform cooperative beamforming for data transmission to a single UE. While only a serving cell transmits data to the UE, user scheduling/beamforming may be determined through coordination among cells of the CoMP unit.

Uplink CoMP reception refers to uplink reception of a transmitted signal through coordination at a plurality of geographically separated points. Uplink CoMP schemes include joint reception (JR) and coordinated scheduling/beamforming (CS/CB). In JR, a plurality of reception points receives a signal transmitted on a PUSCH. CS/CB is a technique in which while only one point receives a PUSCH, scheduling/beamforming is performed.

DCI format can be classified into TM-dedicated format and TM-common format. The TM-dedicated format refers to DCI format configured only for a corresponding transmission mode and the TM-common format refers to DCI format commonly configured for all transmission modes. For example, DCI format 2B of the case of TM 8 may be TM-dedicated DCI format, DCI format 2C of the case of TM 9 may be TM-dedicated DCI format, and DCI format 2D of the case of TM 10 may be TM-dedicated DCI format. In addition, DCI format 1A may be TM-common DCI format.

Figure 7:
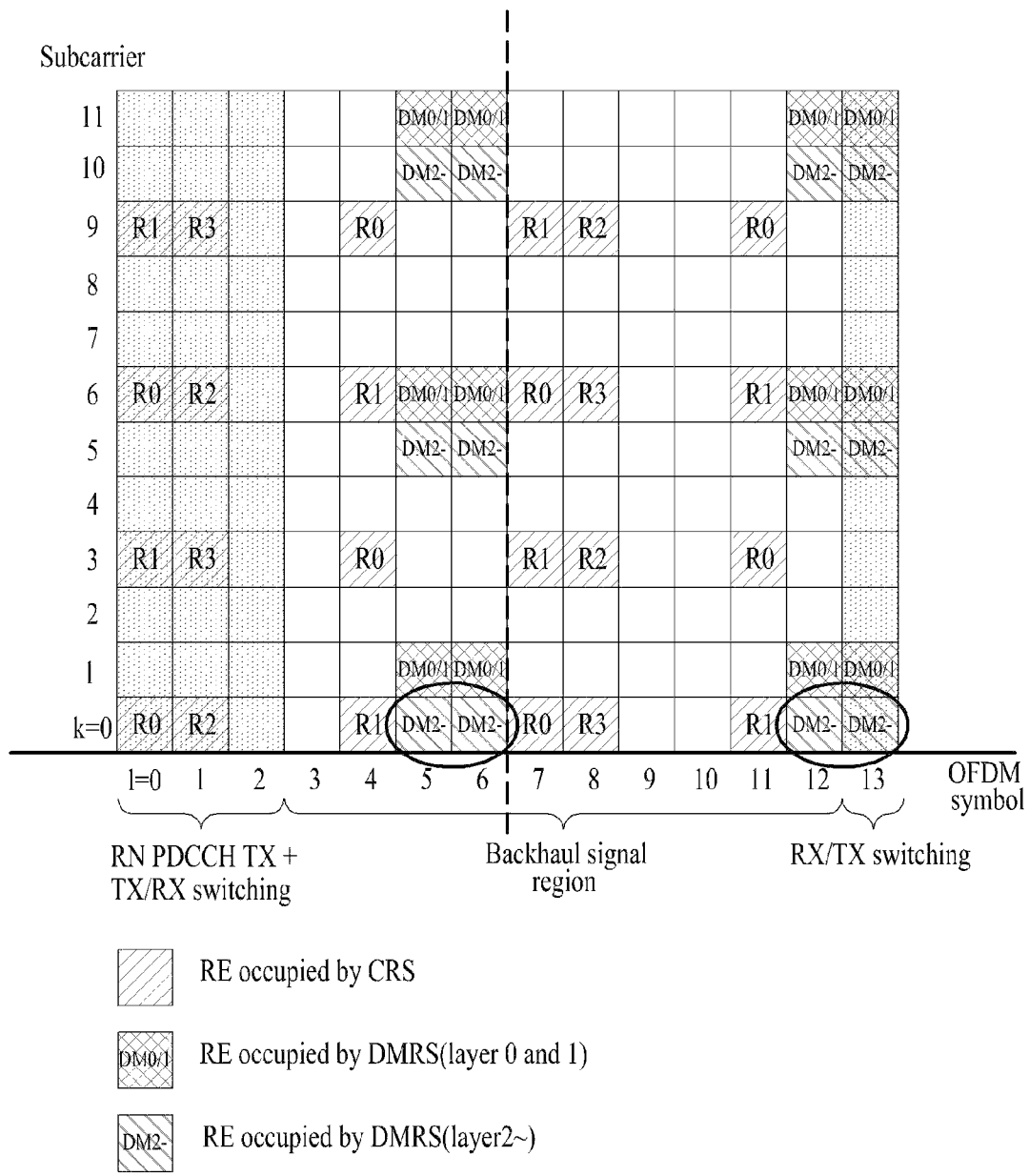
FIG. 7 illustrates a structure of a demodulation reference signal (DM-RS) added to an LTE-A system.

FIG. 7 illustrates a structure of a demodulation reference signal (DM-RS) added to an LTE-A system. The DM-RS is a UE-specific RS used to demodulate a signal of each layer when a signal is transmitted using multiple antennas. The DM-RS is used to demodulate a PDSCH. Since an LTE-A system includes a maximum of eight transmission antennas, a maximum of eight layers and DM-RSs therefor are necessary.

Referring to FIG. 7, the DM-RSs for two or more layers share the same RE and are multiplexed according to a code division multiplexing (CDM) scheme. More specifically, DM-RSs for layers are spread using spreading codes (e.g., Walsh codes or orthogonal codes such as DFT codes) and are multiplexed on the same RE. For example, DM-RSs for layers 0 and 1 share the same RE and are, for example, spread on two REs of OFDM symbols 12 and 13 at a subcarrier 1 (k=1) using orthogonal coding. That is, in each slot, the DM-RSs for layers 0 and 1 are spread along a time axis using codes having a spreading factor (SF) of 2 and are multiplexed on the same REs. For example, the DM-RS for the layer 0 may be spread using [+1 +1] and the MD RS for the layer 1 may be spread using [+1 −1]. Similarly, the DM-RSs for layers 2 and 3 are spread on the RE using different orthogonal codes. The DM-RSs for layers 4, 5, 6 and 7 are spread on the REs occupied by the DM-RSs for layers 0, 1, 2 and 3 using codes orthogonal to the layers 0, 1, 2 and 3. Codes having SF=2 is used for the DM-RS if four or less layers are used and codes having SF=4 is used for the DM-RS if five or more layers are used. Antenna ports for the DM-RS is {7, 8, . . . , n+6} (n being the number of layers).

Figure 8:
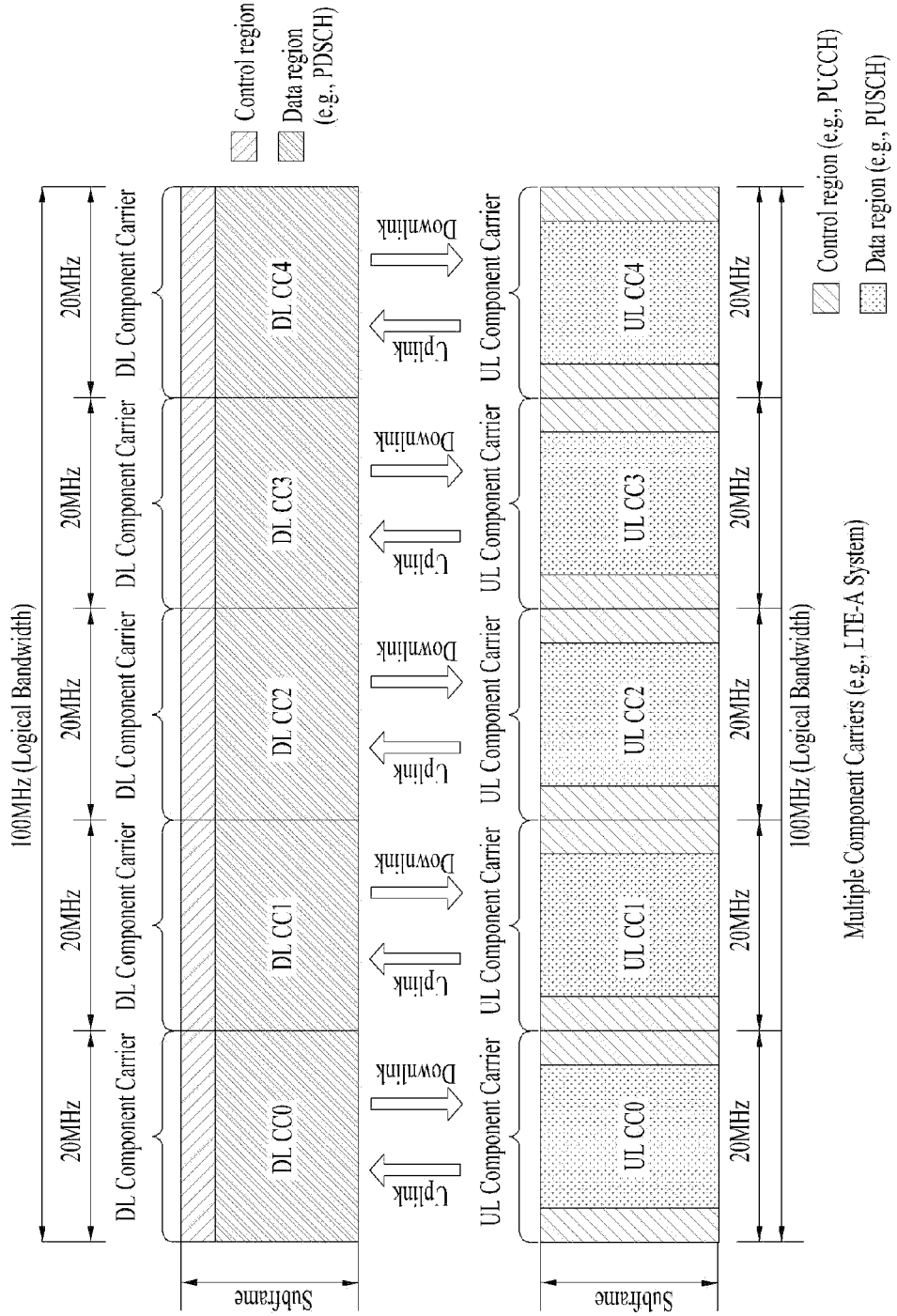
FIG. 8 illustrates a carrier aggregation (CA) communication system.

FIG. 8 illustrates a carrier aggregation (CA) communication system.

Referring to FIG. 8, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC can be referred to as a Primary CC (PCC) (or anchor CC) and other CCs can be referred to as Secondary CCs (SCCs). For example, when cross-carrier scheduling (or cross-CC scheduling) is applied, a PDCCH for DL allocation can be transmitted through DL CC#0 and a PDSCH corresponding thereto can be transmitted through DL CC#2. The term "component carrier" may be replaced with another equivalent term (e.g., carrier, cell, etc.).

For cross-CC scheduling, introduction of a Carrier Indicator Field (CIF) can be considered. The presence or absence of a CIF in a PDCCH can be set semi-statically and UE-specifically (or UE-group-specifically) according to higher layer signaling (e.g. RRC signaling). The base line of PDCCH transmission is summarized as follows.

CIF disabled: A PDCCH on a DL CC allocates a PDSCH resource on the same DL CC or allocates a PUSCH resource on a linked UL CC.
No CIF
CIF enabled: A PDCCH on a DL CC can allocate a PDSCH or a PUSCH on a specific UL/DL CC from among a plurality of aggregated DL/UL CCs using the CIF.
LTE DCI format extended to have CIF
CIF (when configured) is a fixed x-bit field (e.g., x=3)
A position of CIF (when configured) is fixed irrespective of DCI format size.

When a CIF is present, a BS can allocate a PDCCH monitoring DL CC (set) in order to reduce BD complexity of a UE. For PDSCH/PUSCH scheduling, the UE detects/decodes a PDCCH only on DL CCs corresponding to the DL CC set. In addition, the UE may transmit the PDCCH only on the monitoring DL CC (set). The monitoring DL CC set can be determined UE-specifically, UE-group-specifically or cell-specifically. Here, the term "monitoring CC (MCC)" can be replaced by equivalent terms "monitoring carrier", "monitoring cell", "scheduling carrier", "scheduling cell", "serving carrier", "serving cell", etc. DL CC for transmitting PDSCH corresponding to PDCCH and UL CC for transmitting PUSCH corresponding to PDCCH may be referred to as a scheduled carrier, a scheduled cell, etc.

Figure 9:
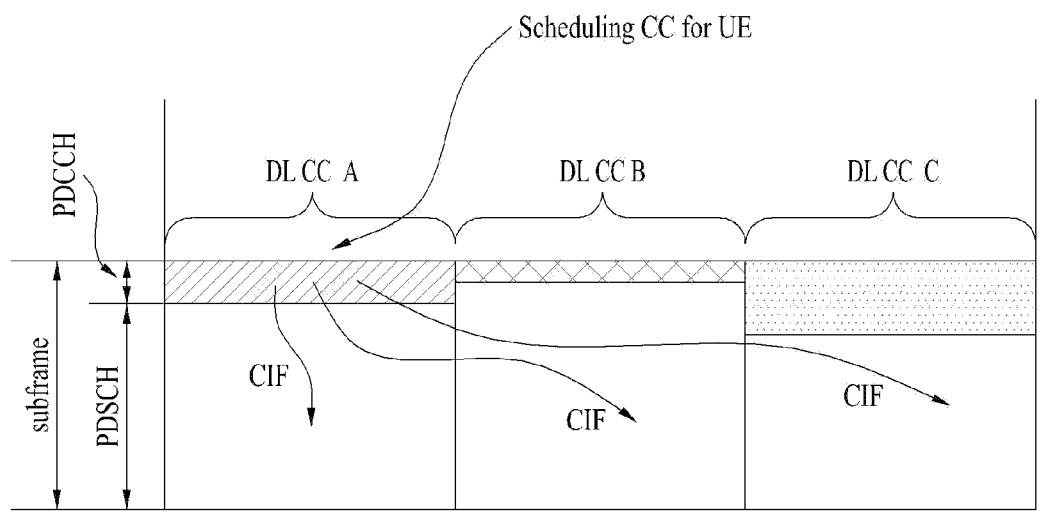
FIG. 9 illustrates cross carrier scheduling.

FIG. 9 illustrates a case in which three DL CCs are aggregated and DL CC A is configured as monitoring DL CC. When a CIF is disabled, each DL CC may transmit PDCCH for scheduling PDSCH of each DL CC without CIF according to a PDCCH rule of an LTE(-A) system. On the other hand, when a CIF is enabled via higher layer signaling, only DL CC A can transmit PDCCH for scheduling PDSCH of other DL CCs as well as PDSCH of DL CC A using the CIF. DL CCs B and C that are not configured as a monitoring DL CC do not transmit PDCCH.

As described with reference to FIGS. 5 and 6, in an LTE(-A) system, a FDD DL carrier and TDD DL subframes use first n OFDM symbols of a subframe for transmission of PDCCH, PHICH, PCFICH, etc. as a physical channel for transmission various control information and use the remaining OFDM symbols for transmission of PDSCH. The number of symbols used for control channel transmission in each subframe is dynamically transmitted to a UE via a physical channel such as PCFICH, etc. or semi-statically transmitted to the UE via RRC signaling. n may be configured as one up to four according to subframe characteristics and system characteristics (FDD/TDD, system bandwidth, etc.). In the LTE(-A) system, there is a limit in that PDCCH as a physical channel for DL/UL scheduling and transmission of various control information is transmitted through limited OFDM symbols. Accordingly, a post-LTE(-A) system (e.g., a system after 3GPP TS 36 series release 11) has used PDSCH and enhanced PDCCH (E-PDCCH) that is more freely multiplexed in an FDM manner.

Figure 10:
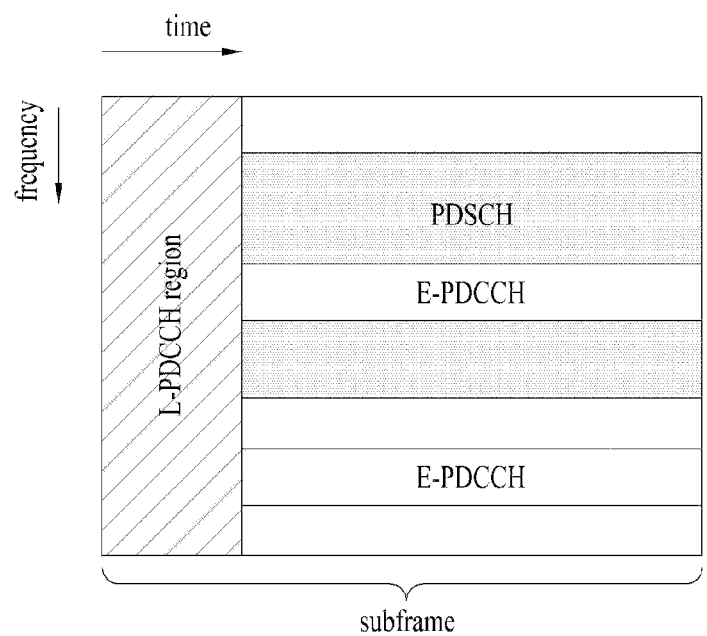
FIG. 10 illustrates an example in which a downlink physical channel is allocated to a subframe.

FIG. 10 illustrates an example in which a downlink physical channel is allocated to a subframe.

Referring to FIG. 10, PDCCH (for convenience, legacy PDCCH, L-PDCCH) used in an LTE(-A) system can be allocated to a control region (refer to FIGS. 5 and 6) of the subframe. In FIG. 10, an L-PDCCH region refers to a region to which the legacy PDCCH can be allocated. According to the context, the L-PDCCH region may refer to a control region, a control channel resource region (i.e., CCE resource) to which PDCCH can be actually allocated in the control region, or a PDCCH search space. Meanwhile, PDCCH can be further allocated in a data region (e.g., a resource region for PDSCH, refer to FIGS. 5 and 6). PDCCH allocated to the data region is referred to as an E-PDCCH. As illustrated in FIG. 10, a control channel resource may be further ensured via the E-PDCCH so as to alleviate scheduling limitation due to limited control channel resource of the L-PDCCH region.

In detail, the E-PDCCH may be detected/demodulated based on a DM-RS. The E-PDCCH may be configured to be transmitted over a PRB pair on the time axis. More particularly, a search space (SS) for E-PDCCH detection may include one or a plurality of (e.g., 2) E-PDCCH candidate sets. Each E-PDCCH set may occupy a plurality of (e.g., 2, 4, and 8) PRB pairs. An enhanced-CCE (E-CCE) included in the E-PDCCH set may be mapped in the localized or distributed form (according to whether one E-CCE is spread in a plurality of PRB pairs). In addition, when E-PDCCH-based scheduling is configured, a subframe for E-PDCCH transmission/detection may be determined. The E-PDCCH may be configured only for a USS. A UE may attempt to detect DCI only for L-PDCCH CSS and E-PDCCH USS in a subframe (hereinafter, E-PDCCH subframe) configured for E-PDCCH transmission/detection and attempt to detect DCI for L-PDCCH CSS and L-PDCCH USS in a subframe (non-E-PDCCH subframe) that is not configured for E-PDCCH transmission/detection.

In the case of E-PDCCH, from a UE point of view, a USS may include K E-PDCCH set (s) (for each respective CC/cell). K may be a value that is equal to or greater than 1 and is equal to or smaller than a specific upper limit (e.g., 2). In addition, each E-PDCCH set may include N PRBs (which belong to the PDSCH region). Here, N and PRB resource/index of the N PRBs may be independently allocated for each respective E-PDCCH set. Thus the number and index of E-CCE resources included in each E-PDCCH set may be configured (UE-specially and) set-specifically. PUCCH resource/index linked to each E-CCE resource/index may be configured (UE-specially and) set-specifically by configuring independent start PUCCH resource/index for each respective E-PDCCH set. Here, the E-CCE may refer to a basic control channel unit of an E-PDCCH including a plurality of REs (which belong to PRB in a PDSCH region). The E-CCE may have different structures according to E-PDCCH transmission type. For example, an E-CCE for localized transmission may be configured using REs belonging to the same PRB pair. On the other hand, an E-CCE for distributed transmission may be configured using an RE extracted from a plurality of PRB pairs. In the case of localized E-CCE, an antenna port (AP) may be independently used for each respective E-CCE resource/index in order to perform optimum beamforming on each use. On the other hand, in the case of distributed E-CCE, the same antenna port set may be repeatedly used in different E-CCEs such that a plurality of users can commonly use an antenna port.

Like the L-PDCCH, the E-PDCCH carriers DCI. For example, the E-PDCCH carriers downlink scheduling information and uplink scheduling information. The E-PDCCH/PDSCH procedure and the E-PDCCH/PUSCH procedure are the same/similar to in the case described with operations S107 and S108 of FIG. 1. That is, a UE may receive E-PDCCH and receive data/control information through PDSCH corresponding to the E-PDCCH. In addition, the UE may receive the E-PDCCH and transmit data/control information through PUSCH corresponding to the E-PDCCH. In an LTE(-A) system, a PDCCH candidate region (hereinafter, a PDCCH search space) is pre-reserved in a control region and PDCCH of a specific UE is transmitted in a portion of the control region. Thus the UE may acquire PDCCH of the UE in a PDCCH search space via blink decoding. Similarly, E-PDCCH may also be transmitted over a partial or entire portion of the pre-reserved resource.

Figure 11:
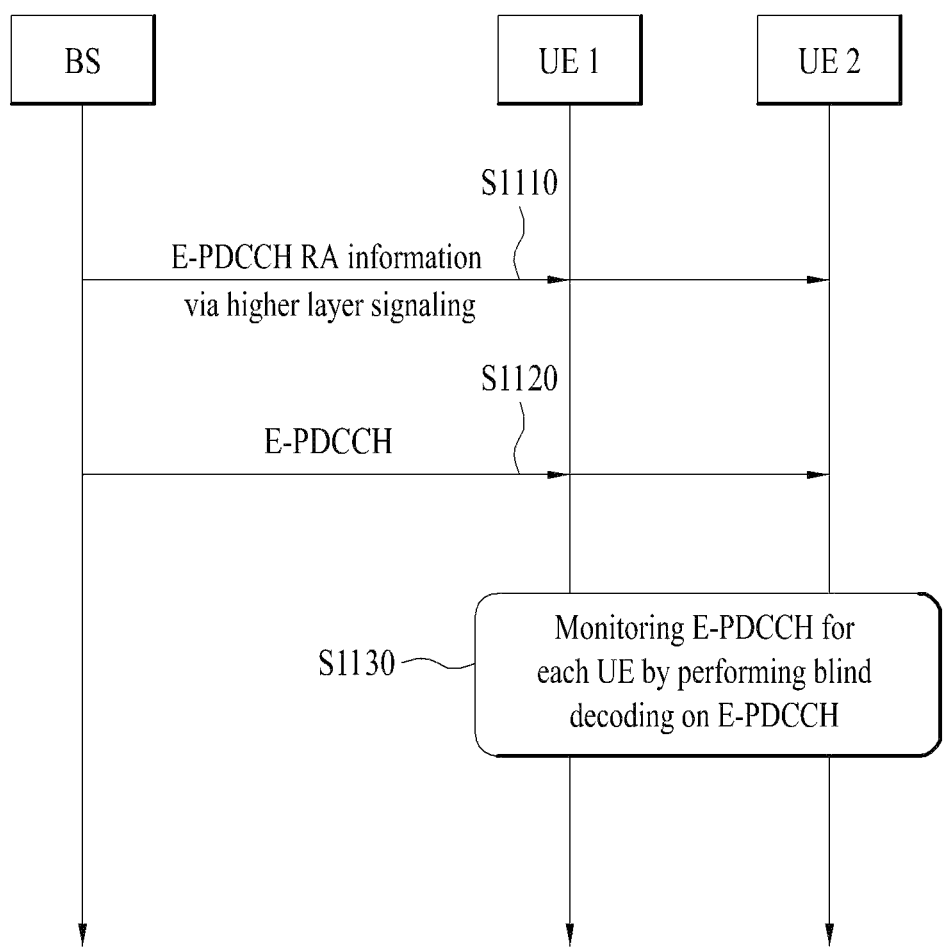
FIG. 11 illustrates an example of resource allocation for E-PDCCH and E-PDCCH receiving procedure.

FIG. 11 illustrates an example of resource allocation for E-PDCCH and E-PDCCH receiving procedure.

Referring to FIG. 11, a BS transmits E-PDCCH resource allocation (RA) information to a UE (S1110). The E-PDCCH RA information may include RB (or virtual resource block (VRB)) allocation information. The RB allocation information may be given in RB unit or resource block group (RBG) unit. The RBG includes two or more consecutive RBs. The E-PDCCH RB information may be transmitted via higher layer (e.g., radio resource control layer, and RRC layer) signaling. Here, the E-PDCCH RB information may be used to pre-reserve E-PDCCH resource (region). Then the BS transmits an E-PDCCH to the UE (S1120). The E-PDCCH may be transmitted in a partial or entire region of the E-PDCCH resource (e.g., M RBs) reserved in step S1110. Thus the UE may monitor a resource (region) (hereinafter, E-PDCCH search space) in which the E-PDCCH can be transmitted (S1130). The E-PDCCH search space may be given as a portion of the RB set allocated in step S1110. Here, the monitoring may include blind decoding of a plurality of E-PDCCH candidates in a search space.

Figure 12:
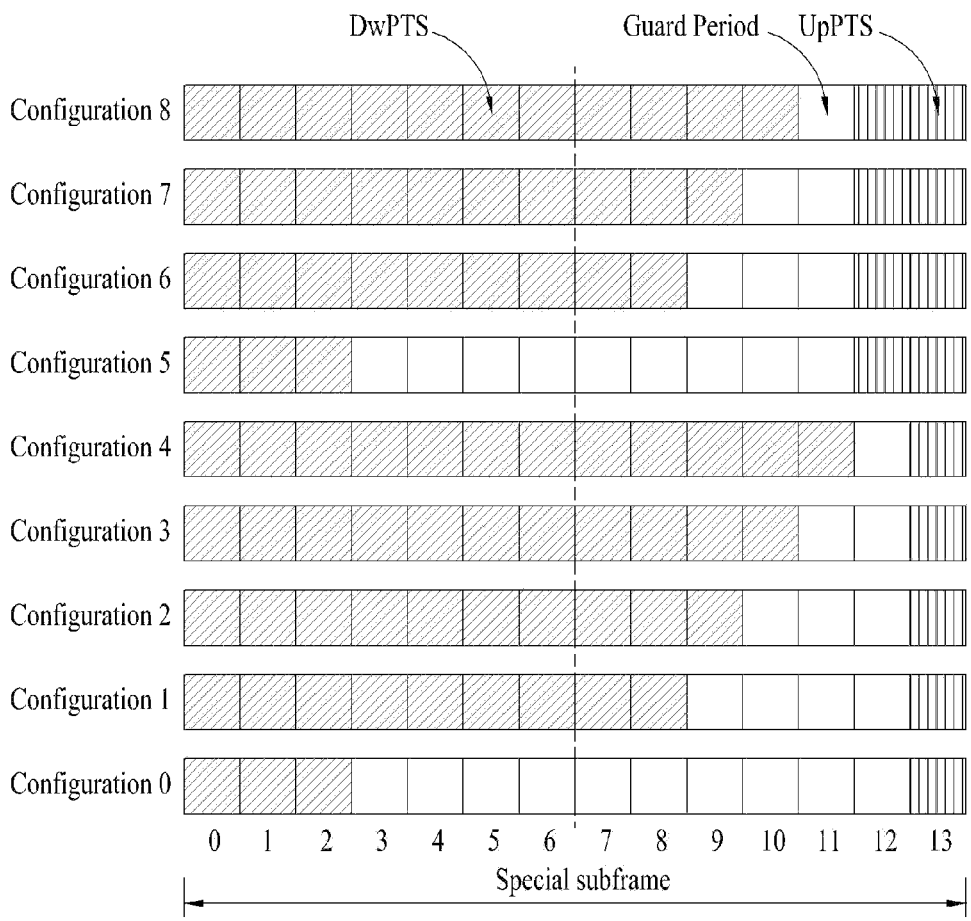
FIG. 12 illustrates special subframe configuration.

An LTE-A system considers a method for supporting aggregation of a plurality of CCs (i.e., carrier aggregation) and transmitting ACK/NACK for a plurality of downlink data (e.g., data transmitted through PDSCH) transmitted through a plurality of CCs through only one specific CC (e.g., a PCC). As described above, CC except for PCC may be referred to as SCC and ACK/NACK for DL data may be referred to as "A/N". In addition, the LTE-A system may support cross CC scheduling in carrier aggregation. In this case, one CC (e.g., scheduled CC) may be pre-configured so as to be downlink (DL)/uplink (UL) scheduled through one specific CC (e.g., scheduling CC) (i.e., so as to receive DL/UL grant PDCCH for corresponding scheduled CC). The scheduling CC may basically perform downlink/uplink scheduling on the scheduling CC. ACK/NACK for UL data (e.g., data transmitted through PUSCH) transmitted through scheduling/scheduled CC may be transmitted through the scheduling CC (i.e., PHICH of scheduling CC). The scheduling CC may be referred to as monitoring CC (MCC), the scheduled CC may be referred to as secondary CC (SCC), and ACK/NACK for UL data may be referred to as "PHICH". All search spaces (SSs) (i.e., in which blind detection is performed on PDCCH) configured to detect PDCCH for scheduling MCC/SCC in a cross CC scheduling relation are present in a control channel region of MCC. Cross CC scheduling (from a UE point of view) may be an appropriate operation when a control channel region of SCC is not appropriate for PDCCH transmission due to interference influence, channel state, etc FIG. 12 illustrates the number of OFDM symbols of a downlink period (e.g., DwPTS), a protection period (e.g., GP), and a downlink period (e.g., UpPTS) according to configuration of Table 2. For convenience, the case in which a normal CP is used (i.e., 14 OFDM symbols/subframes) is illustrated. Referring to FIG. 12, the number of OFDM symbols used for downlink transmission (i.e., DwPTS) varies according to S configuration. In detail, S configurations #0 and #5 may use first three OFDM symbols in a first slot as a downlink period (e.g., DwPTS). On the other hand, S configurations #1, #2, #3, #4, #6, #7, and #8 may use all OFDM symbols of a first slot in a downlink period (e.g., DwPTS).

In addition, a TDD-based LTE(-A) system may require a transmission and reception timing gap including a transmission and reception switching gap for conversion between transmission and reception operations to a UL subframe (SF) from a DL SF. To this end, a method for managing a special subframe (S SF) between a corresponding DL SF and a UL SF is considered. In detail, various special subframe configurations proposed in Table 2 can be supported according to a situation such as a radio condition, a UE location, etc. In this case, a configured downlink period (e.g., a downlink pilot time slot (DwPTS) and uplink period (e.g., downlink pilot time slot (DwPTS)) may be changed according to a CP combination (normal or extended) used in DL/UL. Here, S SF configuration, downlink period (e.g., DwPTS) of which includes only three OFDM symbols, is referred to as "shortest S" for convenience. For example, referring to FIG. 12, S SF configurations #0 and #5 in the case of normal CP and S SF configurations #0 and #4 in the case of extended CP may be referred to as "shortest S".

In the case of LTE(-A) system, in general, a control channel such as CRS and PCFICH/PDCCH/PHICH (in first some OFDM subframe(s)) is transmitted through all DL SFs (except for DL SFs configured for a special purpose (e.g., MBSFN)) on a carrier. As such, in the LTE(-A) system, backward compatibility for providing UE access/service can be ensured. On the other hand, a next system (e.g., a system after 3GPP technology standard (TS) 36 series release 11) may use a new type of carrier in which an entire or partial portion of a legacy signal/channel is not transmitted due to enhancement in inter-cell interference, enhancement in carrier extension, improved characteristics (e.g., 8Tx MIMO), etc. For convenience, the new carrier type is referred to as a new carrier type (NCT). On the other hand, a carrier type used in an LTE(-A) system is referred to as a legacy carrier type (LCT). Throughout this specification, the LTE(-A) system may be referred to as a system that conforms with 3GPP technology standard (TS) 36 series Release 8, 9, 10.

From an RS transmission point of view, an LCT carrier may have CRS transmission fixed over all bands in first at least some OFDM symbols in all subframes. On the other hand, the NCT carrier can omit or greatly reduce fixed CRS transmission with high density. A CRS transmitted in the NCT carrier may be an RS having the same configuration as a CRS of the LCT carrier, an RS having a similar configuration as a CRS of the LCT carrier, or an RS that is newly defined for the NCT carrier. In addition, the NCT carrier may enhance DL reception performance and reduce RS overhead so as to effectively use DL resource via DL data reception based on UE-specific DM-RS and measurement of a channel state based on a configurable channel state information RS (CSI-RS) with relatively low density. Thus only TMs (e.g., TM 8, 9, 10) based on DM-RS among TMs shown in Table 5 may be managed (i.e., TMs are configured as DL TM of a UE that the NCT carrier is allocated) and DL data scheduling may be performed through the NCT carrier.

In the NCT carrier, synchronization, tracking, and measurement need to also be performed. To this end, PSS/SSS having the same or different structure from in the LTE(-A) system may be transmitted. For example, in the NCT carrier, a relative order between SSs, SS transmission OFDM symbol positions, etc. may be changed. In addition, for synchronization, tracking, etc., the CRS may be transmitted only in some subframes and/or some frequency resources. In detail, the CRS can be partially transmitted on a specific time (e.g., k (e.g., k=1) subframe periods having a specific period) and a specific frequency (e.g., a region corresponding to n (e.g., n=6) specific RB pairs). In addition, one the NCT carrier, the CRS may be transmitted only one specific antenna port. In the NCT carrier, when the CRS is mainly transmitted for synchronization, tracking, etc., the CRS may not be used as a demodulation RS for DL signal and control channel. In addition, in the NCT carrier, DL/UL scheduling (UL/DL grant PDCCH transmission) may be performed in the form of DM-RS based E-PDCCH instead of the form of CRS based L-PDCCH for enhanced DL control signaling. PDCCH that will be described below may include any L-PDCCH and E-PDCCH based scheduling scheme. In addition, grant may refer to resource allocation information or scheduling information for signal transmission.

Meanwhile, the NCT carrier may not provide accessibility for a UE. For example, the NCT carrier may not be managed stand-alone and may be managed as secondary component carrier/secondary serving cell (SCC/Scell) that is carrier aggregated (CA) via higher layer signaling (e.g., RRC signaling) for a UE that is accessed and connected through the LCT carrier. In this case, as described above, the NCT carrier may be configured in such a way that legacy control channel transmission and CRS-based DL signal/channel demodulation operations are excluded in order to effectively use/manage DL resource. Thus transmission of PHICH demodulated using the CRS may be limited to the NCT carrier. In addition, when a special subframe (e.g., a shortest S) configured as a very short downlink period (e.g., DwPTS) is configured for a TDD-based NCT, if the corresponding special subframe (S SF) is configured at UL grant transmission timing for scheduling a specific UL subframe, a downlink period (e.g., DwPTS) in the corresponding special subframe (S SF) is too short to configure E-PDCCH and thus, UL grant (and/or DL grant) transmission may not be allowed.

The present invention proposes a method for configuring monitoring CC (MCC) for scheduling DL/UL data transmitted in an NCT carrier. For convenience of description, the case in which a random CC is configured to be scheduled from the corresponding CC is defined as self CC scheduling or self carrier scheduling, and the case in which a random CC is configured to be scheduled from another CC is defined as cross CC scheduling or cross carrier scheduling. In addition, for convenience, when DCI format type for UL/DL grant is generalized, DCI format configured to be specified for each DL transmission mode (TM) may refer to downlink dedicated DCI format or DL dedicated DCI format. For example, referring to Table 5, DCI format 2B of the case of TM 8, DCI format 2C of the case of TM 9, and DCI format 2D of the case of TM 10 may be DL dedicated DCI format. In addition, DCI format that is commonly configured for all DL transmission modes (TMs) may be referred to as downlink common DCI format (or DL common DCI format). For example, referring to Table. 5, DCI format 1A may be DL common DCI format. In addition, DCI format that is specified and configured for each UL transmission mode (TM) may be referred to as uplink dedicated DCI format (or UL dedicated DCI format) and DCI format that is commonly configured for all UL transmission modes (TMs) may be referred to as uplink common DCI format (or UL common DCI format). For example, DCI format 4 may be UL dedicated DCI format and DCI format 0 may be UL common DCI format. In addition, DCI format having the same size and commonly configured for all DL/UL transmission modes (TM) may be referred to as uplink/downlink common DCI format (or DU common DCI format). For example, DCI format 0/1A may be DU common DCI format. Based on this, a cross CC/self CC scheduling mode for DL/UL data transmission/scheduling in the NCT carrier is proposed.

Cross CC Mode

According to this method, with regard to a random NCT carrier (DL/UL data transmission therethrough), MCCs for transmission of UL/DL grant for scheduling the random NCT carrier may be configured as one specific LCT carrier in the same way. According to the present invention, UL/DL grant for the corresponding NCT carrier may not be transmitted through the corresponding NCT carrier. In detail, all of DL dedicated DCI format, UL dedicated DCI format, and DU common DCI format for scheduling DL/UL data transmission in the NCT carrier may be transmitted/received through the corresponding specific LCT carrier (e.g., MCC).

Self CC Mode 0

According to this method, with regard to a random NCT carrier (DL/UL data transmission therethrough), MCCs for transmission of UL/DL grant for scheduling the random NCT carrier may be configured as the corresponding NCT carrier in the same way. In detail, all of DL dedicated DCI format, UL dedicated DCI format, and DU common DCI format for scheduling DL/UL data transmission in the NCT carrier may be transmitted/received through the corresponding NCT carrier.

Self CC Mode 1

According to this method, with regard to a random NCT carrier, MCCs for transmission of DL grant may be configured as the corresponding NCT carrier and MCCs for transmission of UL grant (and/or PHICH corresponding thereto) may be separated and configured as a specific LCT carrier. In detail, when an NCT carrier and an LCT carrier are aggregated, DL dedicated DCI format and DL common DCI format for scheduling DL data transmission in the NCT carrier are transmitted through the corresponding NCT carrier, whereas UL dedicated DCI format and UL common DCI format for scheduling UL data transmission may be transmitted through a specific LCT carrier (e.g., MCC). In this case, in order to maintain a maximum number of times of blind decoding (BD) as in an LTE-A system (e.g., Release 10 LTE-A system), total blind decoding number of times (or the number of PDCCH candidates) allocated to legacy DU common DCI format may be distributed and allocated to DL common DCI format and UL common DCI format.

Self CC Mode 2

According to this method, with regard to a random NCT carrier, MCCs for transmission of DL dedicated DCI format-based DL grant may be configured as the corresponding NCT carrier and MCCs for transmission of other UL/DL grant (e.g., UL dedicated DCI format-based UL grant (and/or PHICH corresponding thereto) and DU common DCI format-based UL/DL grant (and/or PHICH corresponding thereto) may be separated and configured as a specific LCT carrier. In detail, when an NCT carrier and an LCT carrier are aggregated, DL dedicated DCI format for scheduling DL data transmission in the NCT carrier is transmitted through the corresponding NCT carrier, whereas UL dedicated DCI format and UL common DCI format for scheduling UL data transmission, and DL common DCI format for scheduling DL data transmission may be transmitted through a specific LCT carrier (e.g., MCC). This method is advantageous in that a maximum number of times of blind decoding (BD) is maintained as in the LTE-A system (e.g., Release 10 LTE-A system).

Figure 13:
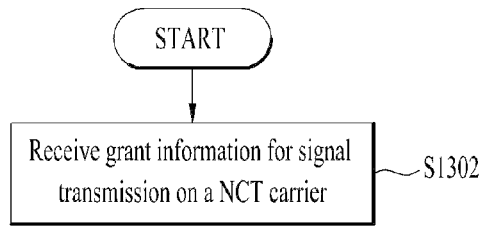
FIG. 13 illustrates a flowchart of a method for receiving control information by a UE when an NCT carrier and an LCT carrier are aggregated.

FIG. 13 illustrates a flowchart of a method for receiving control information by a UE according to self CC mode 1 or self CC mode 2 when an NCT carrier and an LCT carrier are aggregated.

In step S1302, the UE may receive grant information for signal transmission in an NCT carrier. For example, when cross carrier scheduling is not configured, the UE may receive grant information through the NCT carrier. However, as described above, a CRS may not be transmitted through the NCT carrier, a DMRS may not be transmitted at subframe timing for receiving grant information, or corresponding subframe timing is special subframe of TDD, the UE may not receive UL grant (and/or PHICH corresponding thereto) information through the NCT carrier. Accordingly, when cross carrier scheduling is not configured, a BS may differently determine a carrier type for transmission of grant information according to a type of DCI format. For example, the BS may transmit grant information including a first type of DCI format through an NCT carrier and transmit grant information including a second type of DCI format through an LCT carrier.

Accordingly, in step S1302, when grant information for signal transmission on an NCT carrier includes the firs type of DCI format, the UE may receive grant information through the NCT carrier. That is, the UE may receive the grant information including the first type of DCI format through the NCT carrier and perform blind detection for the first type of DCI format on the NCT carrier. On the other hand, when grant information includes the second type of DCI format for signal transmission on the NCT carrier, the UE may receive the grant information through a specific LCT carrier (e.g., MCC). That is, the UE may receive the grant information including the second type of DCI format through a specific LCT carrier (e.g., MCC) and perform blind detection for the second type of DCI format on a specific LCT carrier (e.g., MCC).

In step S1302, when the UE is configured to be in self CC mode 1, the first type of DCI format may include DL-dedicated DCI format and/or DL-common DCI format and the second type of DCI format may include UL-dedicated DCI format and/or UL-common DCI format. As described above, when the UE is configured to be in self CC mode 1, total blind decoding number of times (or the number of PDCCH candidates) allocated to legacy DU common DCI format may be distributed and allocated to DL common DCI format and UL common DCI format in order to maintain a maximum number of times of blind decoding (BD) as in an LTE-A system. In this case, the sum of a total blind decoding number of times for the DL-common DCI format and a total blind decoding number of times for UL-common DCI format may be configured to be equal to or smaller than a maximum number of times for blind decoding for DU-common DCI format.

In step S1302, when the UE is configured to be in self CC mode 2, the first type of DCI format may include DL-dedicated DCI format and the second type of DCI format may include UL-dedicated DCI format, UL-common DCI format, and/or DL-common DCI format.

Hereinafter, embodiments in which a scheduling mode for at least one NCT carrier is configured when at least one NCT carrier is aggregated using the aforementioned cross CC mode and self CC modes 0, 1, and 2 will be described Method 0

According to Method 0, when an NCT carrier and an LCT carrier are aggregated, a scheduling mode for the NCT carrier may be configured as one of cross CC mode and self CC mode 0. Method 0 may be similar to a scheduling mode configuration method in an LTE-A system. For example, in the cross CC mode, UL/DL grant for scheduling the NCT carrier may be transmitted and received through a specific LCT carrier (e.g., MCC). In self CC mode 0, UL/DL grant for scheduling the NCT carrier may be transmitted and received through the NCT carrier. Table 6 shows a carrier for receiving UL/DL grant according to Method 0.

TABLE 6

|  | Cross CC mode | Self CC mode 0 |
| --- | --- | --- |
| UL/DL grant for NCT carrier | Specific LCT carrier (e.g., MCC) | NCT Carrier |

Method 1

According to Method 1, when an NCT carrier and an LCT carrier are aggregated, a scheduling mode for the NCT carrier may be configured only as cross CC mode. In this case, UL/DL grant for scheduling the NCT carrier may not be transmitted and received through the NCT carrier. That is, according to Method 1, since cross CC scheduling is configured for the NCT carrier, UL/DL grant for scheduling the NCT carrier may be transmitted and received through only a specific LCT carrier (e.g., MCC). Table 7 shows a carrier for receiving UL/DL grant according to Method 1.

TABLE 7

|  | Cross CC mode | Self CC mode |
| --- | --- | --- |
| UL/DL grant for NCT carrier | Specific LCT carrier (e.g., MCC) |  |

Method 2

According to Method 2, when an NCT carrier and an LCT carrier are aggregated, a scheduling mode for the NCT carrier may be configured as cross CC mode and self CC modes 0, 1, and 2. For example, when cross CC scheduling is configured, UL/DL grant for scheduling the NCT carrier may be transmitted and received through a specific LCT carrier (e.g., MCC) according to the cross CC mode. When the cross CC scheduling is not configured, UL/DL grant for scheduling the NCT carrier may be transmitted and received in one of self CC modes 0, 1, and 2. When the self CC mode 0 is configured, UL/DL grant for scheduling the NCT carrier may be transmitted and received through the NCT carrier. When the self CC mode 1 is configured, DL grant for scheduling the NCT carrier may be transmitted and received through the NCT carrier and the UL grant (and/or PHICH corresponding thereto) for scheduling the NCT carrier may be transmitted and received through a specific LCT carrier (e.g., MCC). When the self CC mode 2 is configured, DL-dedicated DCI format-based DL grant among DL grant for scheduling the NCT grant may be transmitted and received through the NCT carrier and UL grant (and/or PHICH corresponding thereto) and DL-common DCI format-based DL grant may be transmitted and received through a specific LCT carrier (e.g., MCC). Table 8 shows a carrier for receiving UL/DL grant according to Method 2.

TABLE 8

| UL/DL grant for NCT carrier | Cross CC mode | Self CC mode 0 | Self CC mode 1 | Self CC mode 2 |
|---|---|---|---|---|
| DL-dedicated DCI format | Specific LCT carrier (e.g., MCC) | NCT Carrier | NCT Carrier | NCT Carrier |
| DL-common DCI format | Specific LCT carrier (e.g., MCC) | NCT Carrier | NCT Carrier | Specific LCT carrier (e.g., MCC) |
| UL-dedicated DCI format | Specific LCT carrier (e.g., MCC) | NCT Carrier | Specific LCT carrier (e.g., MCC) | Specific LCT carrier (e.g., MCC) |
| UL-common DCI format | Specific LCT carrier (e.g., MCC) | NCT Carrier | Specific LCT carrier (e.g., MCC) | Specific LCT carrier (e.g., MCC) |

Method 3

According to Method 3, when an NCT carrier and an LCT carrier are aggregated, a scheduling mode for the NCT carrier may be configured as one of cross CC mode and self CC modes 1 and 2. For example, when cross CC scheduling is configured, UL/DL grant for scheduling the NCT carrier may be transmitted and received through a specific LCT carrier (e.g., MCC) according to the cross CC mode. When the cross CC scheduling is not configured, UL/DL grant for scheduling the NCT carrier may be transmitted and received according to one of the self CC modes 1 and 2. When the self CC mode 1 is configured, DL grant for scheduling the NCT carrier may be transmitted and received through the NCT carrier and UL grant (and/or PHICH corresponding thereto) for scheduling the NCT carrier may be transmitted and received through a specific LCT carrier (e.g., MCC). When the self CC mode 2 is configured, DL-dedicated DCI format-based DL grant among DL grant for scheduling the NCT carrier may be transmitted and received through the NCT carrier and UL grant (and/or PHICH corresponding thereto) and DL-common DCI format-based DL grant may be transmitted and received through a specific LCT carrier (e.g., MCC). Table 9 shows a carrier for receiving UL/DL grant according to Method 3.

TABLE 9

| UL/DL grant for NCT carrier | Cross CC mode | Self CC mode 1 | Self CC mode 2 |
|---|---|---|---|
| DL-dedicated DCI format | Specific LCT carrier (e.g., MCC) | NCT Carrier | NCT Carrier |
| DL-common DCI format | Specific LCT carrier (e.g., MCC) | NCT Carrier | Specific LCT carrier (e.g., MCC) |
| UL-dedicated DCI format | Specific LCT carrier (e.g., MCC) | Specific LCT carrier (e.g., MCC) | Specific LCT carrier (e.g., MCC) |
| UL-common DCI format | Specific LCT carrier (e.g., MCC) | Specific LCT carrier (e.g., MCC) | Specific LCT carrier (e.g., MCC) |

Methods 0 to 3 may be changed as necessary.

For example, Method 0 may be applied to the case of FDD system and one of Methods 1 to 3 may be applied to the case of TDD system.

As another example, Method 0 (cross CC mode or self CC mode 0) may be applied for a basic scheduling mode and cross CC mode may be exceptionally applied only to some specific subframes when a scheduling mode is configured as self CC mode 0 (Option 1). Alternatively, when a scheduling mode is configured as self CC mode 0, self CC mode 1 or self CC mode 2 may be exceptionally applied only to some specific subframes (Option 2). The some specific subframes may include a subframe in which CRS is not transmitted and/or a subframe in which DMRS is not transmitted and/or a special subframe in a TDD situation. For example, a downlink period (e.g., DwPTS) of a special subframe may be a special subframe including m or less specific OFDM symbols. In this case, for example, m=3 or m=6 or 7.

As another example, when an NCT carrier and other carriers are aggregated in FDD and an NCT carrier and other carriers are aggregated in TDD to configure the same UL-DL configuration, Method 0 may be applied, and when an NCT carrier and other carriers are aggregated in TDD to configure different TDD UL-DL configurations and an NCT carrier and other carriers are aggregated with different frame structure types (FDD or TDD), one of Methods 1 to 3 may be applied. In addition, some specific subframes to which Option 1 or Option 2 is exceptionally applied during an operation in self CC mode 0 may be a subframe configured at UL grant timing for scheduling UL data transmission in an NCT carrier when the NCT carrier and other carriers are aggregation to different TDD UL-DL configurations or different frame structure types.

Thus far, the present invention has been described in terms of an NCT carrier and is not limited to an NCT carrier. It is obvious that the present invention can be extensively applied to an LCT carrier and applied irrespective of a carrier type. For example, with regard to the description for cross CC mode, self CC mode 0, self CC mode 1, and self CC mode 2, the present invention can be applied to the case in which an NCT carrier is considered as a random CC1, an LCT carrier is considered as a random CC2. Here, CC1 and CC2 may be different CCs and a carrier type of each CC may be NCT or LCT.

Figure 14:
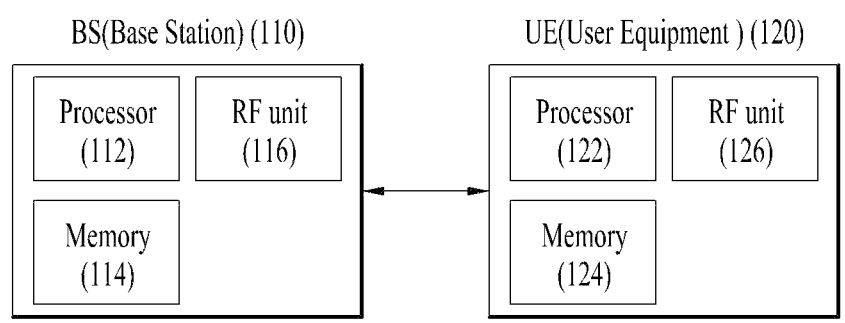
FIG. 14 illustrates a BS and a UE to which the present invention is applicable.

FIG. 14 illustrates a BS and a UE to which the present invention is applicable.

Referring to FIG. 14, a wireless communication system includes a BS 110 and a UE 120. When the wireless communication system includes a relay, the BS and the UE may be replaced with the relay.

The BS 110 includes a processor 112, a memory 114, and a radio frequency (RF) unit 116. The processor 112 may be configured to embody procedures and/or methods proposed according to the present invention. The memory 114 is connected to the processor 112 and stores various information associated with an operation of the processor 112. The RF unit 116 is connected to the processor 112 and transmits and/or receives a radio signal. The UE 120 includes a processor 122, a memory 124, and an RF unit 126. The processor 122 may be configured to embody procedures and/or methods proposed according to the present invention. The memory 124 is connected to the processor 122 and stores various information associated with an operation of the processor 122. The RF unit 126 is connected to the processor 122 and transmits and/or receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method for receiving control information by a user equipment (UE) in a wireless communication system in which a first type of carrier and a second type of carrier are aggregated, the method comprising:
    receiving grant information by the user equipment, the grant information used for signal transmission on the second type of carrier,
    wherein the grant information is received through the second type of carrier when the grant information comprises a first type of downlink control information (DCI) format, and
    wherein the grant information is received through the first type of carrier when the grant information comprises a second type of DCI format, the grant information comprising the second type of DCI format received through the first type of carrier when cross carrier scheduling is not configured for the UE and a cell-specific reference signal (CRS) is not transmitted on the second type of carrier at subframe timing for receiving the grant information.

2. The method according to claim 1, wherein the first type of DCI format comprises downlink dedicated DCI format, and
    wherein the second type of DCI format comprises uplink dedicated DCI format, uplink common DCI format, or downlink common DCI format.

3. The method according to claim 1, wherein the first type of DCI format comprises downlink dedicated DCI format or downlink common DCI format, and
    wherein the second type of DCI format comprises uplink dedicated DCI format or uplink common DCI format.

4. The method according to claim 3, wherein the sum of a total blind decoding number of times for the downlink common DCI format and a total blind decoding number of times for uplink common DCI format is configured to be equal to or less than a maximum number of times for blind decoding for uplink/downlink common DCI format when the downlink common DCI format and the uplink common DCI format are transmitted through the same carrier.

5. The method according to claim 1, wherein the grant information comprising the second type of DCI format is received through the first type of carrier when cross carrier scheduling is not configured for the UE and a demodulation reference signal (DMRS) is not transmitted on the second type of carrier at subframe timing for receiving the grant information.

6. The method according to claim 1, wherein the grant information comprising the second type of DCI format is received through the first type of carrier when cross carrier scheduling is not configured for the UE and subframe timing for receiving the grant information is a subframe comprising an uplink period, a protection period, and a downlink period.

7. The method according to claim 6, wherein the downlink period comprises m or less symbols, where m is one of 3, 6, and 7.

8. A user equipment (UE) for receiving control information in a wireless communication system in which a first type of carrier and a second type of carrier are aggregated, the UE comprising:
    a radio frequency (RF) unit; and
    a processor,
    that receives grant information through the RF unit, the grant information used for signal transmission on the second type of carrier, wherein the grant information is received through the second type of carrier when the grant information comprises a first type of downlink control information (DCI) format, and wherein the grant information is received through the first type of carrier when the grant information comprises a second type of DCI format, the grant information comprising the second type of DCI format received through the first type of carrier when cross carrier scheduling is not configured for the UE and a cell-specific reference signal (CRS) is not transmitted on the second type of carrier at subframe timing for receiving the grant information.

9. The UE according to claim 8, wherein the first type of DCI format comprises downlink dedicated DCI format, and wherein the second type of DCI format comprises uplink dedicated DCI format, uplink common DCI format, or downlink common DCI format.

10. The UE according to claim 8, wherein the first type of DCI format comprises downlink dedicated DCI format or downlink common DCI format, and wherein the second type of DCI format comprises uplink dedicated DCI format or uplink common DCI format.

11. The UE according to claim 10, wherein the sum of a total blind decoding number of times for the downlink common DCI format and a total blind decoding number of times for uplink common DCI format is configured to be equal to or less than a maximum number of times for blind decoding for uplink/downlink common DCI format when the downlink common DCI format and the uplink common DCI format are transmitted through the same carrier.

12. The UE according to claim 8, wherein the grant information comprising the second type of DCI format is received through the first type of carrier when cross carrier scheduling is not configured for the UE and a demodulation reference signal (DMRS) is not transmitted on the second type of carrier at subframe timing for receiving the grant information.

13. The UE according to claim 8, wherein the grant information comprising the second type of DCI format is received through the first type of carrier when cross carrier scheduling is not configured for the UE and subframe timing for receiving the grant information is a subframe comprising an uplink period, a protection period, and a downlink period.

14. The UE according to claim 13, wherein the downlink period comprises m or less symbols, where m is one of 3, 6, and 7.

* * * * *